July 2, 1963 C. P. ROBERTS ETAL 3,095,957
CAP ALIGNING MECHANISM
Filed April 7, 1960 4 Sheets-Sheet 2
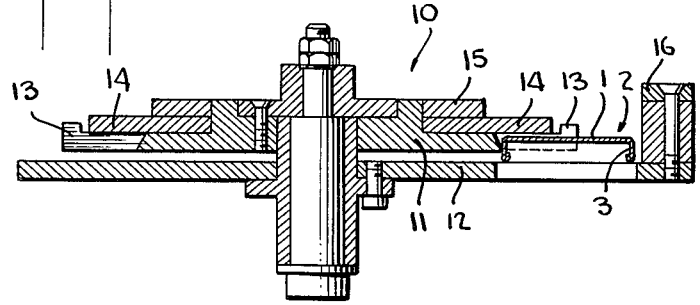
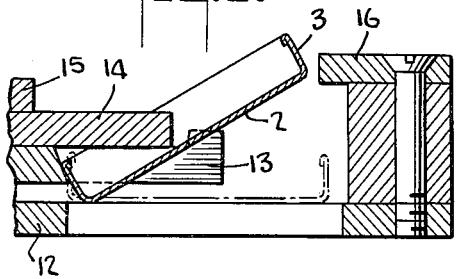
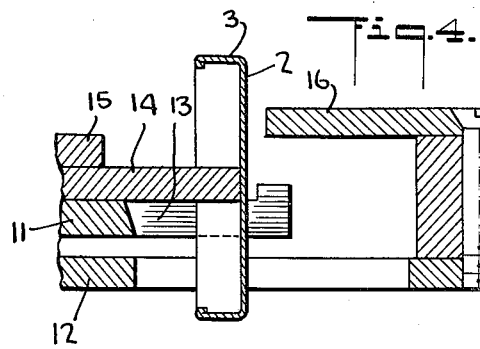
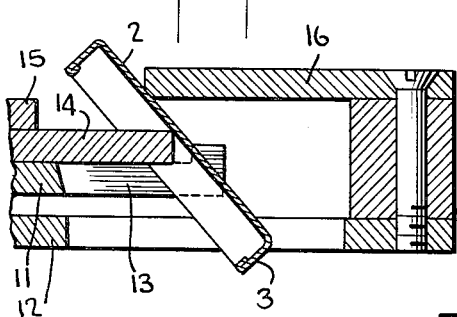
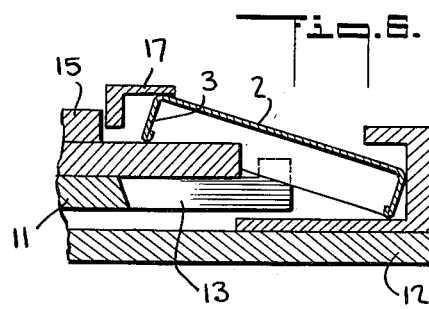
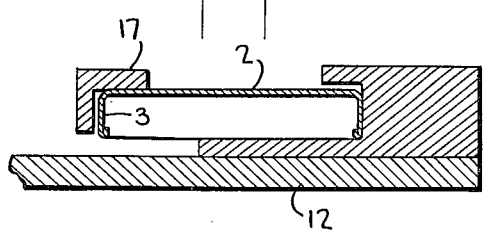
INVENTORS
CECIL P. ROBERTS
FREDERICK V. HILDEBRANDT
BY
Norman K Holland
ATTORNEY July 2, 1963

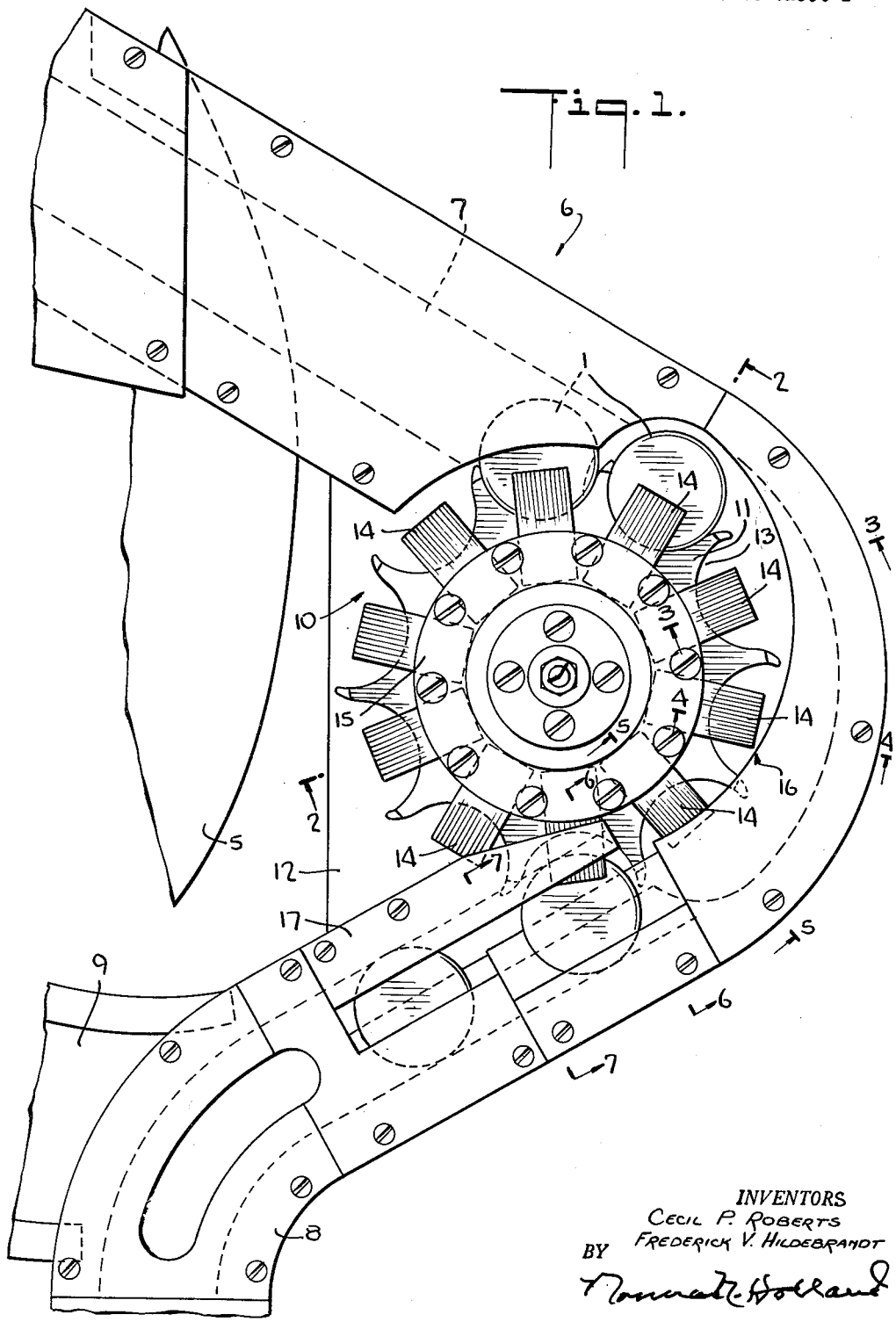

C. P. ROBERTS ETAL 3,095,957

CAP ALIGNING MECHANISM

Filed April 7, 1960

INVENTORS
CECIL P. ROBERTS
FREDERICK V. HILDEBRANDT
BY
Norman R. Holland
ATTORNEY July 2, 1963
C. P. ROBERTS ETAL
3,095,957
CAP ALIGNING MECHANISM
Filed April 7, 1960
4 Sheets-Sheet 4
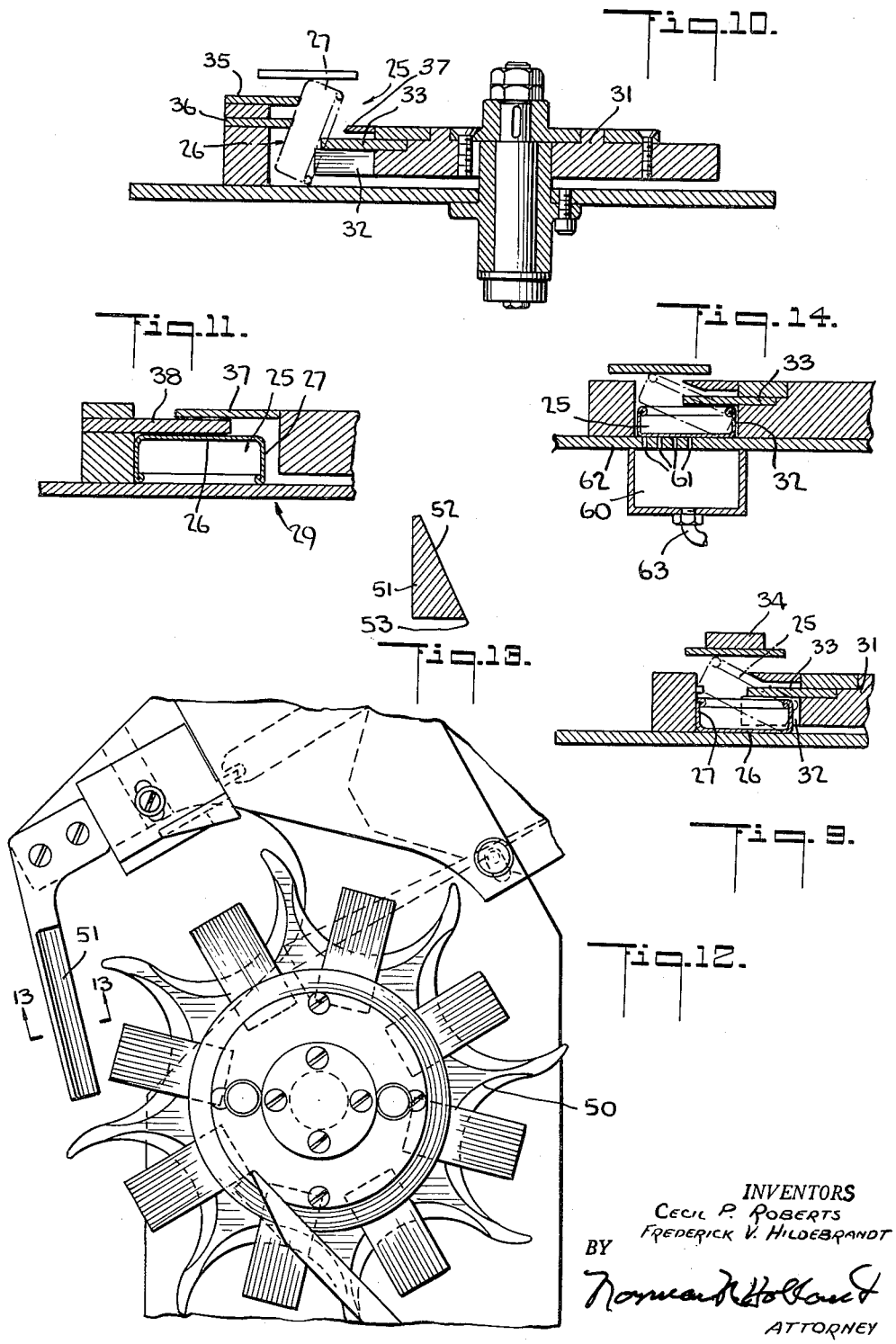
INVENTORS
CECIL P. ROBERTS
FREDERICK V. HILDEBRANDT
BY
Norman R. Holland
ATTORNEY

United States Patent Office 3,095,957
Patented July 2, 1963

3,095,957
CAP ALIGNING MECHANISM
Cecil P. Roberts and Frederick V. Hildebrandt, Lancaster, Ohio, assignors to Anchor Hocking Glass Corporation, Lancaster, Ohio, a corporation of Delaware
Filed Apr. 7, 1960, Ser. No. 20,579
14 Claims. (Cl. 193—43)

The present invention relates to a cap feeding and aligning mechanism to be used in connection with automatic container sealing machines and for other mechanisms in which it is required that the caps or closures be arranged in a uniform order, and more particularly relates to a turn-over mechanism for closures.

In sealing machines in general use today closure caps are fed from a suitable source, such as a hopper, to a sealing mechanism. The closures are applied to a container rim and screwed or pressed thereon to form a sealed package.

In such sealing machines, it is important that the closure caps be presented to the sealing mechanism with their cover portions facing upwardly so that they may be placed directly onto a container. It will be evident that if a cap is presented to a container in an inverted position, i.e., with the cover portion facing downwardly, the cap will not be able to be applied to a container finish, and, unless detected, may cause damage to the container or many jam-up the sealing operation. Therefore, it is important that all the closure caps have their cover portions facing upwardly before they are presented to the sealing mechanism to permit the caps to be applied directly to the container.

Such caps are usually stored in hoppers and are fed to the sealing mechanism one by one. Some of the caps are moved out of the hopper in correct position with their cover portions facing upwardly. In this event the caps are fed directly to the sealing mechanism. However, if a cap is moved out of the hopper with the cover portion facing downwardly, the cap is inverted by a suitable turn-over mechanism to place the cap in its correct position with the cover portion facing upwardly.

Turnover devices have been developed and used for many years. However, such prior devices are complex and subject the closures to scraping and scratching which impairs the lacquer coating and decoration on them. These difficulties occasion complaints on the part of packers.

Other devices in use merely return improperly positioned closures back to the hopper. This is objectionable because the continuity of the sealing operation is interrupted with a consequent loss of time.

The present invention has for one of its objects an improved cap feeding and arranging mechanism which will automatically turn over closure caps which are fed out of the hopper in improper position, i.e., with their cover portions facing downwardly.

Another object of the present invention is to provide an improved turnover mechanism which will turn over every improperly positioned cap without returning improperly positioned caps back to the hopper.

A further object of the present invention is to provide an improved turn-over mechanism which is simple to operate and to maintain.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a plan view of the turn-over mechanism of the present invention showing the caps being passed from a hopper through the turn-over mechanism;

FIG. 2 is a sectional view taken along line 2—2 of FIG. 1 showing the position of the turn-over mechanism when a cap is moved out of the hopper in the proper position;

FIG. 3 is a sectional view taken along line 3—3 of FIG. 1 showing the initial step of inverting an improperly positioned cap;

FIG. 4 is a sectional view taken along lines 4—4 of FIG. 1 showing the second step in the inversion of a cap;

FIG. 5 is a sectional view taken along line 5—5 of FIG. 1 showing the position of the cap as it is being pushed over by a turn-over cam;

FIG. 6 is a sectional view taken along line 6—6 of FIG. 1 showing the position of the cap after the turn-over cam has stopped acting on the cap;

FIG. 7 is a sectional view taken along lines 7—7 of FIG. 1 showing the position of the cap in its fully inverted position;

FIG. 9 is a sectional view taken along line 9—9 of FIG. 8 showing the first step in the inversion process of the cap according to the modification;

FIG. 10 is a sectional view taken along line 10—10 of FIG. 8 showing a further step in the inverting process;

FIG. 11 is a sectional view taken along line 11—11 of FIG. 8 showing the closure cap fully inverted;

FIG. 12 is a plan view of another modification of the present invention;

FIG. 13 is a sectional view taken along line 13—13 of FIG. 12 showing the cross section of the turn-over cam shown in FIG. 12; and FIG. 14 is a sectional view showing another embodiment of the present invention in which air is used to invert the cap.

Figure 8:
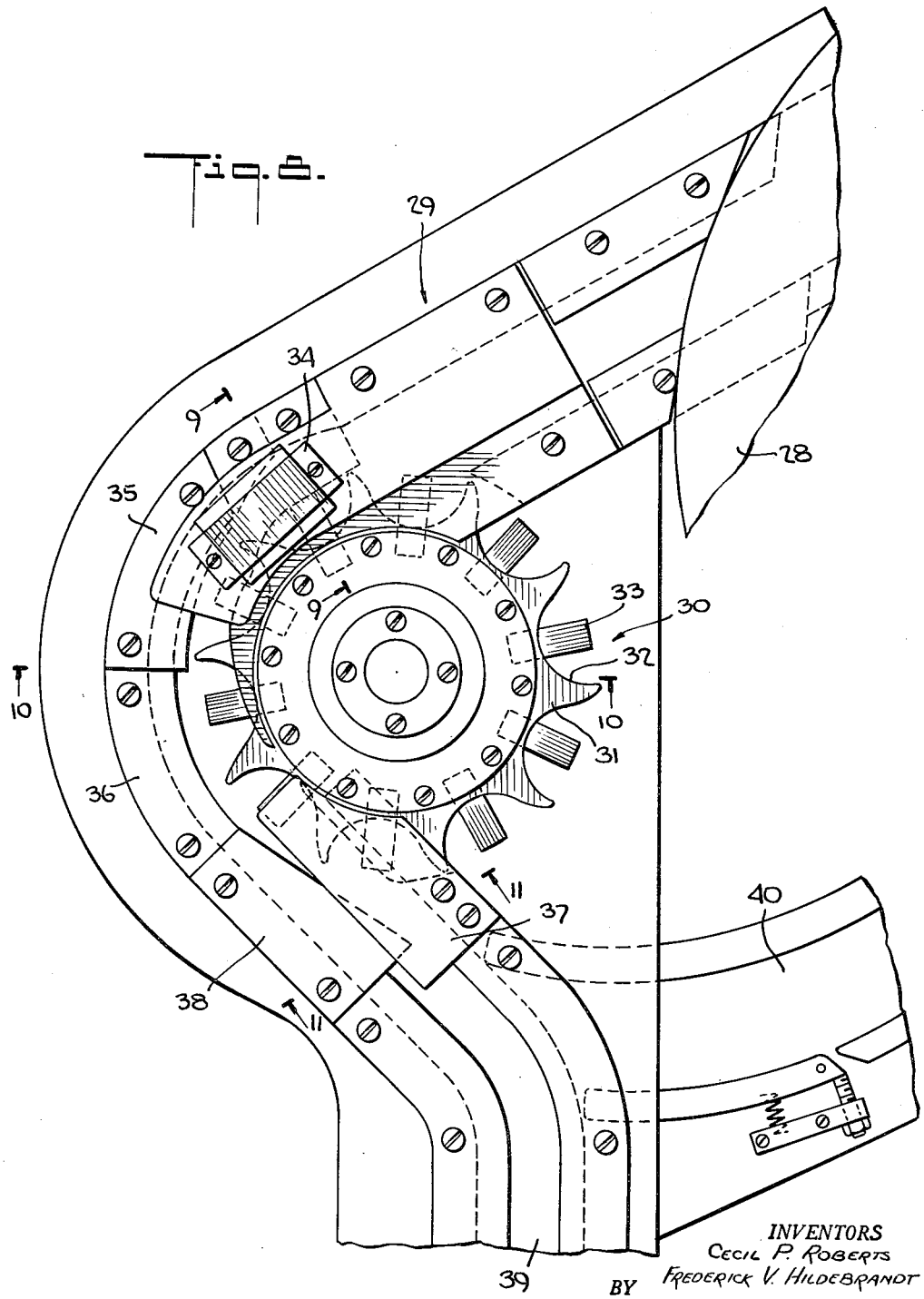
FIG. 8 is a plan view of a modification of the present invention.

Referring more particularly to the drawings, and particularly to FIG. 2, the closure cap 1 which is to be acted on by the turn-over mechanism comprises a cover portion 2 and a skirt portion 3. Suitable locking lugs or other means may be provided on the skirt portion 3 to permit the closure to be applied to a container.

Referring now to FIG. 1, the closure caps are deposited in rotating hopper 5 and are fed one by one from the hopper 5 to a sealing mechanism (not shown) by means of a chute, generally designated at 6. The chute 6 may be of any suitable configuration and is generally provided with a guideway 7 along which closure caps travel.

The closure caps 1 are fed by the hopper to chute 6 either in the correct positions with their cover portions 2 facing upwardly, as shown in FIG. 2 or in the incorrect positions with the cover portions 2 facing downwardly (as shown in dotted lines in FIG. 3).

In order to invert those caps which are improperly positioned, an inverting or turn-over mechanism, generally designated as 10, is inserted in the chute 6 in the path of the moving closure caps. The inverting mechanism 10 comprises a rotating star wheel 11 mounted on a base 12 having a plurality of cap receiving pockets 13 therein adapted to receive each closure cap as it comes from the hopper 5. The star wheel 11 may be rotated by a suitable means in synchronism with the rotating hopper 5, or the star wheel 11 may be rotated by the caps as the hopper forces them down the chute 6, so that each time a cap is moved out of the hopper, the star wheel 11 will have a pocket 13 in position to receive the cap.

Positioned above each pocket 13 is a permanent magnet 14 which is held in place by a top plate 15. The permanent magnets 14 are adapted to raise improperly positioned caps to a generally vertical position or beyond so that a suitable inverting cam may act on the closure cap to help turn it over to the proper position as will be more fully described hereinbelow. Often the parts may be so arranged that the caps to be inverted will turn completely over about the fulcrum and of the magnets with little or no assist from the cams.

If a closure cap 1 is moved out of the hopper 5 in its proper position, i.e., with the cover portion facing upwardly, as shown in FIG. 2, the closure cap will pass under the permanent magnet 14 without being affected by the turnover mechanism and will be moved to the sealing mechanism.

However, if a closure cap 1 is moved out of the hopper 5 improperly positioned, i.e., with its cover portion facing downwardly, as shown in dotted lines in FIG. 3, the turnover mechanism 10 will turn the cap over to its proper position as shown in FIGS. 3 to 7.

The incorrectly positioned closure cap 1 is first raised by the magnetic attraction of permanent magnet 14 acting on the inner cover portion of the cap from the dotted line position shown in FIG. 3 to the angled solid line position of FIG. 3 until it assumes the vertical position shown in FIG. 4. As the star wheel 11 continues to rotate, the vertically positioned closure cap 1 is brought into contact with a suitable inverting cam 16 mounted on the chute 6. The inverting cam 16 acts on the cover 2 of the closure, as shown in FIG. 5, to turn the closure over with the permanent magnet 14 acting as a fulcrum.

Continued rotation of a star wheel 11 moves the closure past the take-off cam 17, as shown in FIG. 6, which moves the closure off the magnet 14 and moves it down to its correct position with the cover portion facing upwardly, as shown in FIG. 7.

The closure may then be conveyed to a sealing mechanism by the continuation 8 of the chute 6.

If closure caps tend to back-up in the continuation 8 of chute 6 a suitable return passageway 9 may be provided to return the excess closures back to the hopper. If the star wheel 11 is driven by pressure from the pressure of the caps as the hopper forces them along chute 6, backing up of the caps merely stops the star.

It will be seen that closure caps which are properly positioned are passed beneath the magnet, as shown in FIG. 2, whereas closure caps which are improperly positioned, i.e., with their cover portions facing downwardly, are inverted to the proper position by the turn-over mechanism, as shown in FIGS. 3 to 7. This embodiment of the invention may be used for all types of closure caps.

FIGS. 8 to 11 show another embodiment of the present invention. This embodiment, while preferably adapted to invert so-called "deep-shelled" caps, i.e., caps in which the length of the skirt is great compared to the diameter of the cap, may also be used to invert all types of caps, whether deep-shelled or not.

Referring more particularly to FIGS. 8 through 11, the closure caps 25, having a cover portion 26 and a deep skirt 27, are fed from a rotating hopper 28 to a suitable chute 29 which leads to an inverting mechanism, generally designated as 30.

The inverting mechanism 30 comprises star wheel 31 having pockets 32 therein for receiving caps from hopper 28. Each pocket 32 is provided with a fulcrum bar 33. Instead of a permanent magnet being provided in each pocket, as in the embodiment shown in FIGS. 1 to 7, the present embodiment provides a stationary permanent magnet 34 at one point along the travel of the star wheel.

This is shown in FIGS. 9 through 11. The closure cap 25 is raised to a vertical position by the permanent magnet 34 as it passes underneath it as shown in FIG. 9, as the star wheel 31 continues to rotate, suitable cams 35 and 36 strike the outer side of cover portion 26 of the vertically positioned closure 25 (FIG. 10) and press it down to its proper position. Further rotation of the star wheel 31 brings the closure cap 25 to the stripping cams 37 and 38 which strip the closure off the star wheel and pass it to continuation 39 of chute 29. A suitable feedback passageway 40 may be provided to return excess closure caps back to the hopper.

It will be seen that this arrangement will also invert closures without the necessity of having a permanent magnet above each pocket in the star wheel.

A modification of the inverting cam system described above is shown in FIGS. 12 and 13. With this arrangement, a star wheel 50 acts in the same manner as the star wheel shown in FIGS. 1 and 8. However, the inverting cam 51 has an angled camming surface 52 with the fulcrum point 53 at its lower edge. The cap is inverted by the lower edge of the cam 53 engaging the cap after it is raised by the magnet to invert the cap about the end of the magnet. Similar to the embodiments described in connection with FIGS. 1 to 7 and 8 to 11, only those caps which are improperly positioned are lifted in a vertical direction so as to be inverted while properly positioned caps are not so raised since they pass beneath the permanent magnets and are unable to be raised.

FIG. 14 shows another modification of the present invention. Instead of using a magnet, air pressure may be used to invert the cap. As shown in FIG. 14, the cap 25 is seated in the pocket 32 of the star wheel. Air under pressure from air chamber 60 is directed through openings 61 in base 62 against the bottom of cap 25 to lift the cap to a vertical position. As the star wheel rotates, suitable cams, such as cams similar to the cams 35 and 36 shown in FIG. 10, then strike the cap to cause it to be inverted. Similar to the embodiments described in connection with FIGS. 1 to 7 and 8 to 11, only those caps which are improperly positioned are lifted in a vertical direction so as to be inverted while properly positioned caps are not so raised since they pass beneath the permanent magnets and are unable to be raised.

It will be noted that the openings 61 are along the outer edge of the cap so that air pressure is directed to one side of the cap to permit the cap to be angled before assuming a vertical position. Air may be supplied to the chamber 60 from a source through suitable conduit 63.

It will be seen from the above that the present invention provides an improved turn-over mechanism which does not require the use of a return mechanism for improperly positioned closures and which is simple to operate and maintain.

As various changes may be made in the form, construction and arrangement of the parts herein without departing from the spirit and scope of the invention and without sacrificing and of its advantages, it is to be understood that all matter herein is to be interpreted as illustrative and not in a limiting sense.

Having thus described my invention, I claim:

1. In a mechanism for inverting caps which are improperly positioned, a rotating star wheel, a hopper synchronously rotated with said star wheel, means for delivering closures from said hopper to the pockets of said star wheel, means for permitting properly positioned closures to pass through the star wheel unaffected, magnetic means associated with said star wheel for raising improperly positioned closure caps toward a substantially vertical position, cam means along the path of said rotating star wheel to invert said vertically positioned caps, means for removing said caps from said star wheel, and means for returning excess caps to said hopper.

2. In a mechanism for inverting caps which are improperly positioned, a rotating star wheel having a plurality of pockets, magnetic means above each pocket for raising improperly positioned caps toward a substantially vertical position, said caps tending to turn completely over by pivoting about the end of the magnet, and cam means to insure inverting of said caps.

3. In a mechanism for inverting improperly positioned closure caps, means for delivering closure caps to a inverting station, magnetic means for magnetically attracting an improperly positioned closure cap toward a substantially vertical position, and means adapted to strike said vertically positioned closure cap to invert it.

4. A mechanism as claimed in claim 3, wherein said magnetic means act on the cover portion to raise it toward a substantially vertical position.

5. A mechanism as claimed in claim 4, wherein a rotating star wheel having pockets is provided and wherein said closure caps are delivered to the pockets of said star wheel.

6. A mechanism as claimed in claim 5 wherein cam means are provided for inverting the closure cap.

7. A cap inverting mechanism as claimed in claim 6, wherein said cam means are adapted to abut the upper portion of the vertically positioned closure to invert it.

8. A cap inverting mechanism as claimed in claim 6 wherein said cam means are adapted to abut the cover portion of said cap to invert it.

9. A mechanism as claimed in claim 5, wherein said magnetic means are positioned in each pocket of said star wheel.

10. A mechanism as claimed in claim 3, wherein said magnetic means acts on said skirt portion to raise it toward a substantially vertical position.

11. A mechanism as claimed in claim 10 wherein a rotating star wheel having closure cap receiving pockets is provided and wherein said magnetic means is located above said star wheel.

12. In a mechanism for inverting improperly positioned closure caps, means for delivering closure caps to an inverting station, magnetic means for magnetically attracting an improperly positioned closure cap to a raised position, and means adapted to strike said raised closure cap to invert it.

13. In a mechanism for inverting improperly positioned closure caps, an inverting station on said mechanism, a fulcrum at said inverting station, means for moving closure caps beneath said fulcrum, means for raising an improperly positioned closure cap around said fulcrum, and means adapted to strike said raised closure cap to invert it.

14. A mechanism as claimed in claim 13, wherein said inverting mechanism includes a rotatable member having a plurality of pockets adapted to receive closure caps therein and wherein said fulcrum comprises a member on the rotatable member extending outwardly and partially over each closure cap delivered to the pocket.

References Cited in the file of this patent

UNITED STATES PATENTS

| | | |
|---|---|---|
| 2,440,959 | Krueger | May 4, 1948 |
| 2,665,005 | Mundy | Jan. 5, 1954 |

FOREIGN PATENTS

| | | |
|---|---|---|
| 291,419 | Germany | Apr. 17, 1916 |
| 474,286 | Canada | June 5, 1951 |